US012631117B2

(12) United States Patent
Cousseau et al.

(10) Patent No.: US 12,631,117 B2
(45) Date of Patent: May 19, 2026

(54) BLADED ASSEMBLY WITH INTER-PLATFORM CONNECTION BY FRICTION MEMBER

(71) Applicants: SAFRAN AIRCRAFT ENGINES, Paris (FR); SAFRAN CERAMICS, Le Haillan (FR)

(72) Inventors: Simon Jean-Marie Bernard Cousseau, Moissy-Cramayel (FR); Romain Claude Gabriel Bardon, Moissy-Cramayel (FR); Fabrice Joël Luc Chevillot, Moissy-Cramayel (FR); Fabrice Marcel Noël Garin, Moissy-Cramayel (FR); Lucien Henri Jacques Quennehen, Moissy-Cramayel (FR)

(73) Assignees: SAFRAN AIRCRAFT ENGINES, Paris (FR); SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 18/874,195

(22) PCT Filed: Jun. 22, 2023

(86) PCT No.: PCT/FR2023/050940
§ 371 (c)(1),
(2) Date: Dec. 12, 2024

(87) PCT Pub. No.: WO2023/247903
PCT Pub. Date: Dec. 28, 2023

(65) Prior Publication Data
US 2025/0354496 A1 Nov. 20, 2025

(30) Foreign Application Priority Data
Jun. 22, 2022 (FR) ...................................... 2206155

(51) Int. Cl.
*F01D 5/22* (2006.01)
*F01D 5/28* (2006.01)

(52) U.S. Cl.
CPC ............. *F01D 5/225* (2013.01); *F01D 5/282* (2013.01); *F05D 2220/323* (2013.01); *F05D 2240/30* (2013.01); *F05D 2300/603* (2013.01)

(58) Field of Classification Search
CPC . F01D 5/22; F01D 5/225; F01D 5/282; F01D 9/04; F01D 9/041; F05D 2260/96; F05D 2220/323; F05D 2300/603
See application file for complete search history.

(56) References Cited

U.S. PATENT DOCUMENTS 3,752,599 A * 8/1973 Pace ...................... F01D 5/225 416/190
9,188,014 B2 11/2015 Fachat et al.
(Continued)

FOREIGN PATENT DOCUMENTS

FR 2 955 142 A1 7/2011
FR 2 955 608 A1 7/2011
JP 2001-200701 A 7/2001

OTHER PUBLICATIONS

International Search Report issued Sep. 19, 2023 in PCT/FR2023/050940, filed on Jun. 22, 2023, 2 pages.

*Primary Examiner* — Elton K Wong
(74) *Attorney, Agent, or Firm* — Oblon, McClelland, Maier & Neustadt, L.L.P.

(57) ABSTRACT

A bladed assembly for a turbomachine includes: a plurality of blades distributed about an axis and each including an airfoil and a platform formed at a free end of the blade. The platform of each blade includes a friction member and an opening that is oblong in a circumferential direction with respect to the axis. The friction member is engaged through the opening formed in the platform of a circumferentially (Continued)

adjacent blade within the bladed assembly with a clearance allowing the friction member to move at least in the circumferential direction within the opening. Mutual separation of the platforms in the circumferential direction during operation due to vibrations of the blades causes the friction member to rub against an edge of the opening and thereby dissipate energy.

9 Claims, 3 Drawing Sheets

(56) References Cited

U.S. PATENT DOCUMENTS

| | | | | |
|---|---|---|---|---|
| 9,194,240 | B2 | 11/2015 | Blanchard et al. | |
| 9,333,603 | B1 * | 5/2016 | Christophel | F01D 9/042 |
| 10,738,634 | B2 * | 8/2020 | Lamson | F01D 5/225 |
| 2013/0170994 | A1 * | 7/2013 | Jones | F01D 5/225 416/189 |
| 2014/0023506 | A1 | 1/2014 | Kleinow | |
| 2015/0003979 | A1 * | 1/2015 | Willett, Jr. | F01D 25/06 415/209.3 |
| 2017/0356298 | A1 * | 12/2017 | Carty | F01D 9/042 |
| 2020/0256199 | A1 * | 8/2020 | Mattheij | F01D 5/24 |

* cited by examiner

BLADED ASSEMBLY WITH INTER-PLATFORM CONNECTION BY FRICTION MEMBER

TECHNICAL FIELD

The present invention relates to the general field of bladed assemblies within turbomachines, in particular turbomachines intended for aircraft propulsion.

More particularly, it relates to the damping of vibrations appearing during operation between the platforms of two adjacent circumferential blades of a bladed assembly.

PRIOR ART

A bladed assembly for a turbomachine, for example a movable bladed assembly of a low-pressure turbine stage of a turbojet, comprises a disk whereon blades are mounted.

At the outer radial end thereof, also known as summit, the blades each have a transverse element, called platform, which in particular has the function of externally delimiting the flow passage for the gas stream passing through the turbine or, more generally, the relevant part of the turbomachine.

The platform of such a blade includes an upstream edge and a downstream edge oriented perpendicular to the flow direction of the gas stream. These edges are connected together via two side edges forming the circumferential ends of the platform and whereby the platform of the blade comes substantially into contact with the platforms of the two blades of the bladed assembly that are directly circumferentially adjacent thereto.

A known solution for limiting the vibrational stresses on such blades consists in providing each of these side edges with a complex profile comprising non-axial portions, that is to say not parallel to the axis of rotation of the bladed assembly, and comprising for example excrescences and complementary indentations. Indeed, in order to dampen the vibrations to which the blades are subjected during the operation of the turbine, it is known to mount the blades on the disk with a torsional stress about the main axis thereof. At the platform of a particular blade, this torsional stress results in placing non-axial portions of the platform of the blade into contact with non-axial portions of the platforms of the neighbouring blades. The vibrations of the blades during operation induce relative sliding at these contact areas, which, coupled with contact pressures, create the friction damping. This type of configuration is sometimes known as "interlock".

With this type of solution, the inter-platform contact force may change during operation, in particular due to a natural rotation of the airfoil about the mean line thereof, and due to a relative movement between circumferentially adjacent platforms leading the latter to move closer or move further apart.

In this particular case where the contact force reduces during operation with respect to the stop situation, it is necessary to amplify this contact force when mounting the blades in order to obtain a required level of force at high speed, where the need to dampen the vibrations is felt the most. Such an adaptation results in static overstress applied to the blades.

This is particularly detrimental in the case of blades made of composite materials, in particular ceramic matrix composite (CMC), due to relatively low permissible stress levels for this type of material, which make the blades fairly intolerant to pre-torsion. Thus, for a blade made of CMC, a strong pre-torsion upon mounting induces high static stresses with regard to the permissible level, and sometimes even above the latter.

Moreover, this type of material expands considerably less than the metal materials of which the blades were conventionally manufactured. In the case of blades having platforms configured as indicated above, this results in a separation of the circumferentially adjacent platforms when hot and therefore in a reduction of the contact force during operation.

Means for damping the turbomachine blade vibrations while overcoming the issues explained above relative to the pre-torsion of the blades were proposed by the applicant. The general idea therefore consists in having no cold contact between circumferentially adjacent blades, but generating such a hot contact.

The document FR2956152 describes an example of solution of this type, wherein the contact between two circumferentially adjacent platforms is carried out by a damper part mounted with a certain radial clearance under one of the platforms bearing under the other platform under the effect of the centrifugal force during operation and thus exerting frictional forces.

However, the solution presented in this document has a drawback due to the fact that the damper part extends partially in the flow duct of the gas stream and thus constitutes a cause of disturbances of this gas stream.

The document FR2955142 describes another example, wherein the damper part has ends recessed within cavities formed within the circumferentially adjacent platforms, also with a certain radial clearance, so as to bear against the wall delimiting each of the cavities under the effect of the centrifugal force during operation.

Due to the fact that the cavities extend in the circumferential direction and have closed sections transversal to the circumferential direction, the solution presented in this document makes it possible to introduce friction dissipation due to the relative movements of the platforms. This solution is not intrusive in the gas stream. On the other hand, this solution leads to making the platform heavy due to the relatively high volume of material required to form the cavities and the damper part, which is detrimental to the strength of the airfoil.

The document FR2955608 also describes another example, wherein the damper part is a sheet having ends recessed within cavities formed within circumferentially adjacent platforms, so as to bear against the wall delimiting each of the cavities under the effect of the centrifugal force during operation. Therefore, this solution also makes it possible to limit the possibilities of mutually separating two platforms in the direction of the axis of rotation of the bladed assembly.

DISCLOSURE OF THE INVENTION

The aim of the invention is to provide a solution for attenuating the vibrations of bladed assemblies for a turbomachine, in particular those of which the blades are made of composite material such as a ceramic matrix composite (CMC) material, in particular making it possible to limit as best as possible the mechanical stresses applied to the blades and to avoid all or some of the abovementioned drawbacks.

To this end, it proposes a bladed assembly for a turbomachine, comprising a plurality of blades distributed about an axis and each comprising an airfoil, and a platform formed at a free end of the blade, and wherein the platform of each blade includes a friction member and an opening that is oblong in a circumferential direction with respect to the axis, the friction member being engaged through the opening formed in the platform of a circumferentially adjacent blade within the bladed assembly with a clearance allowing the friction member to move at least in the circumferential direction within the opening.

In preferred embodiments, an angle between a plane of an oblong closed section of the opening and a radial direction with respect to the axis, at said opening, is between 45 degrees and 90 degrees.

The plane of said oblong closed section is preferably orthogonal to the radial direction.

In preferred embodiments, said friction member has a geometry of revolution about an axis that extends in said radial direction.

In preferred embodiments, the platform of each blade has a surface from which said friction member radially protrudes, and an engagement part that extends circumferentially protruding from a circumferential end of the platform, which is radially offset with respect to the surface, and through which said opening is formed.

In preferred embodiments, said friction member is integrally formed with said platform.

In preferred embodiments, the friction member has an end surface level with a surface of the engagement part. In other words, the end surface of the friction member is flush with said surface of the engagement part.

The invention also relates to a turbine for a turbomachine, comprising at least one bladed assembly of the type described above.

The invention also relates to a turbomachine comprising at least one turbine of the type described above.

BRIEF DESCRIPTION OF THE DRAWINGS

The invention will be better understood and other details, advantages and features will become apparent upon reading the following description provided by way of non-limiting example and with reference to the appended drawings wherein.

In all of these figures, identical references may designate identical or similar elements.

DETAILED DISCLOSURE OF PREFERRED EMBODIMENTS

Figure 1:
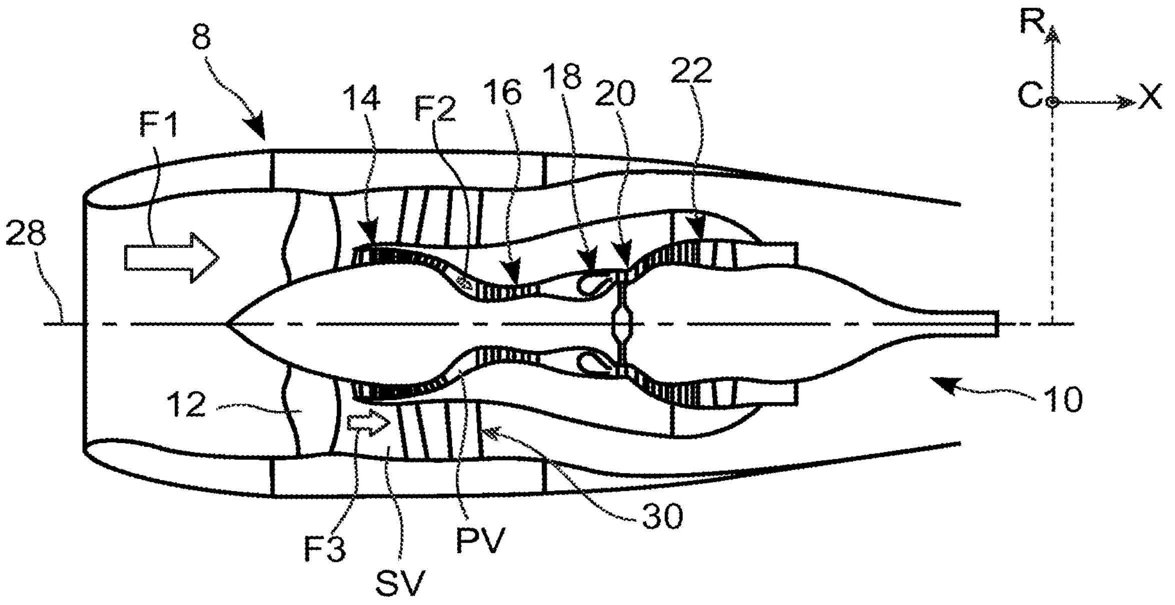
FIG. 1 is a schematic axial sectional view of a turbomachine.

FIG. 1 illustrates a turbomachine 10, for example a twin-spool turbo-fan engine for an aircraft, generally including a fan 12 intended to suck in an air flow F1 splitting downstream of the fan into a primary flow F2 circulating in a primary flow channel, hereinafter known as the primary duct PV, and a secondary flow F3 circulating within a secondary flow channel, hereinafter known as the secondary duct SV, arranged about the primary duct PV.

The turbomachine includes, generally, a low-pressure compressor 14, a high-pressure compressor 16, a combustion chamber 18, a high-pressure turbine 20 and a low-pressure turbine 22 that jointly define the primary duct PV.

The respective rotors of the high-pressure compressor and of the high-pressure turbine are connected by a shaft referred to as the "high-pressure shaft", whereas the respective rotors of the low-pressure compressor and of the low-pressure turbine are connected by a shaft referred to as the "low-pressure shaft", in a well-known manner. These rotors are rotatably mounted about an axis 28 of the turbomachine.

Throughout this description, the axial direction X is the direction of the axis 28. The radial direction R is in any point a direction orthogonal to the axis 28 and passing through the latter, and the orthoradial or circumferential direction C is in any point a direction orthogonal to the radial direction R and to the axis 28. A transverse plane is a plane orthogonal to the axis 28. The terms "inner" and "outer" respectively refer to a relative proximity, and a relative distance, of one element with respect to the axis 28. Finally, the "upstream" and "downstream" directions are defined with reference to the general direction of the flow of gases in the primary PV and secondary ducts SV of the turbomachine, according to the axial direction X.

Figure 2:
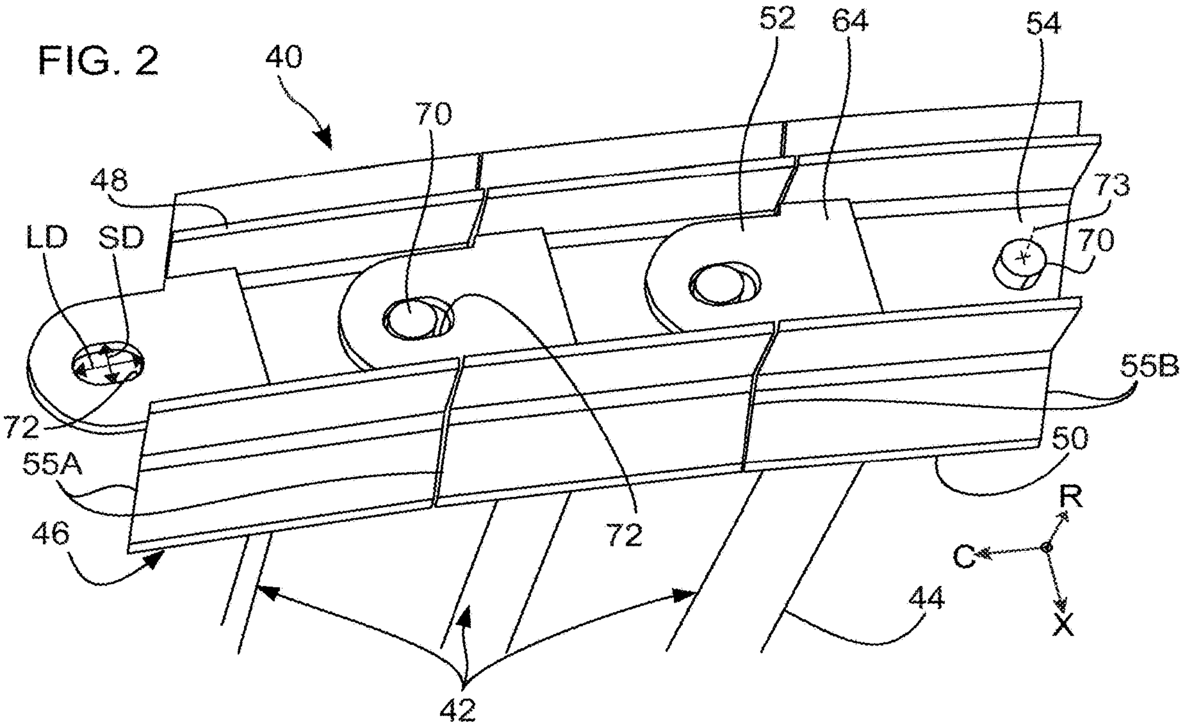
FIG. 2 is a schematic partial perspective view of a bladed assembly for a turbomachine according to a preferred embodiment of the invention, seen radially from the outside, in particular showing respective platforms of blades of the bladed assembly.
Figure 3A:
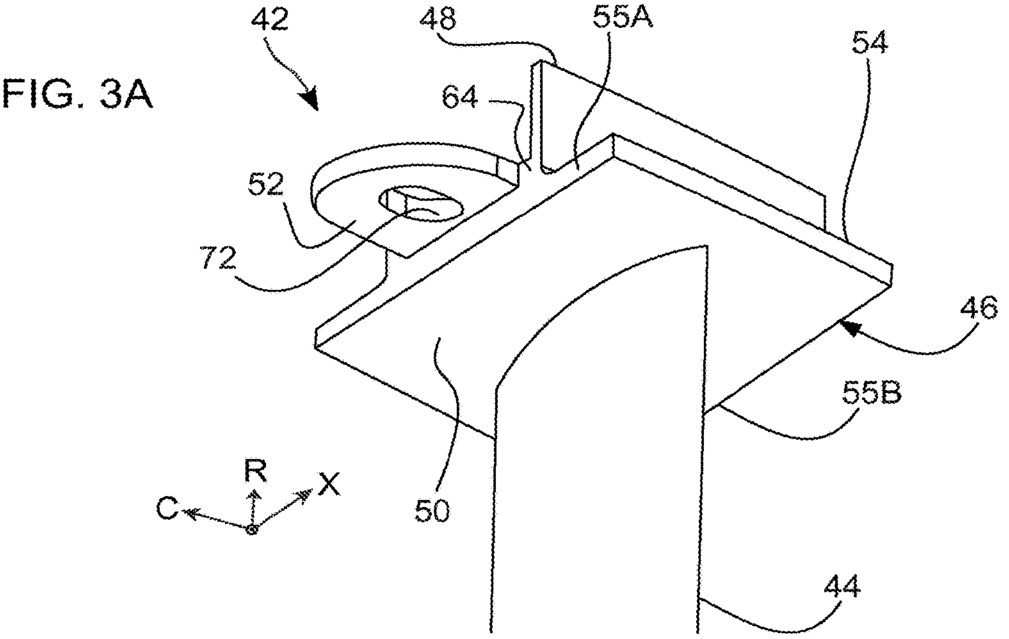
FIG. 3A is a schematic partial perspective view of a blade of the bladed assembly of FIG. 2, seen radially from the inside.
Figure 3B:
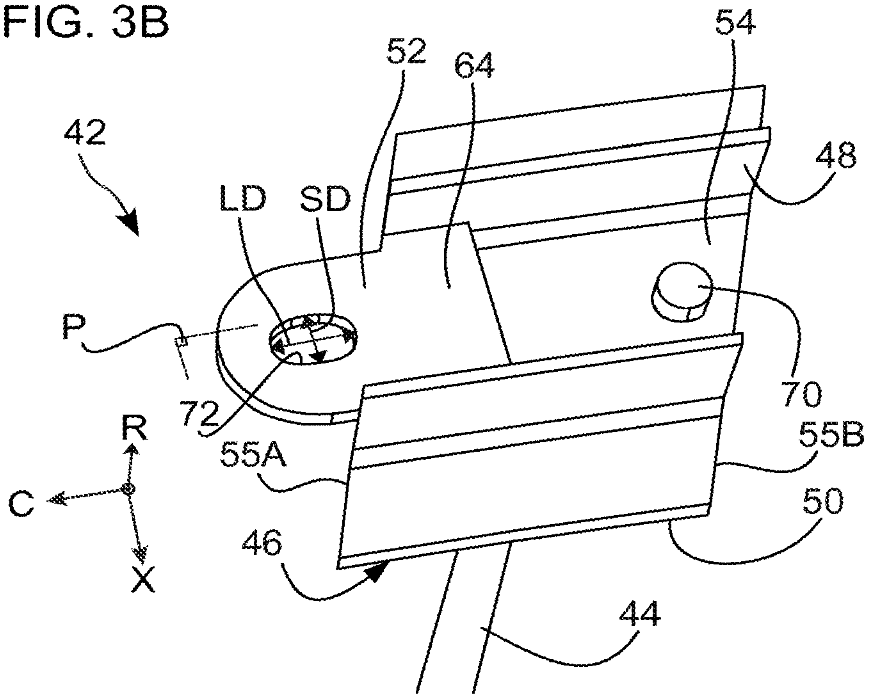
FIG. 3B is a schematic partial perspective view of a blade of FIG. 3A, seen radially from the outside.
Figure 4:
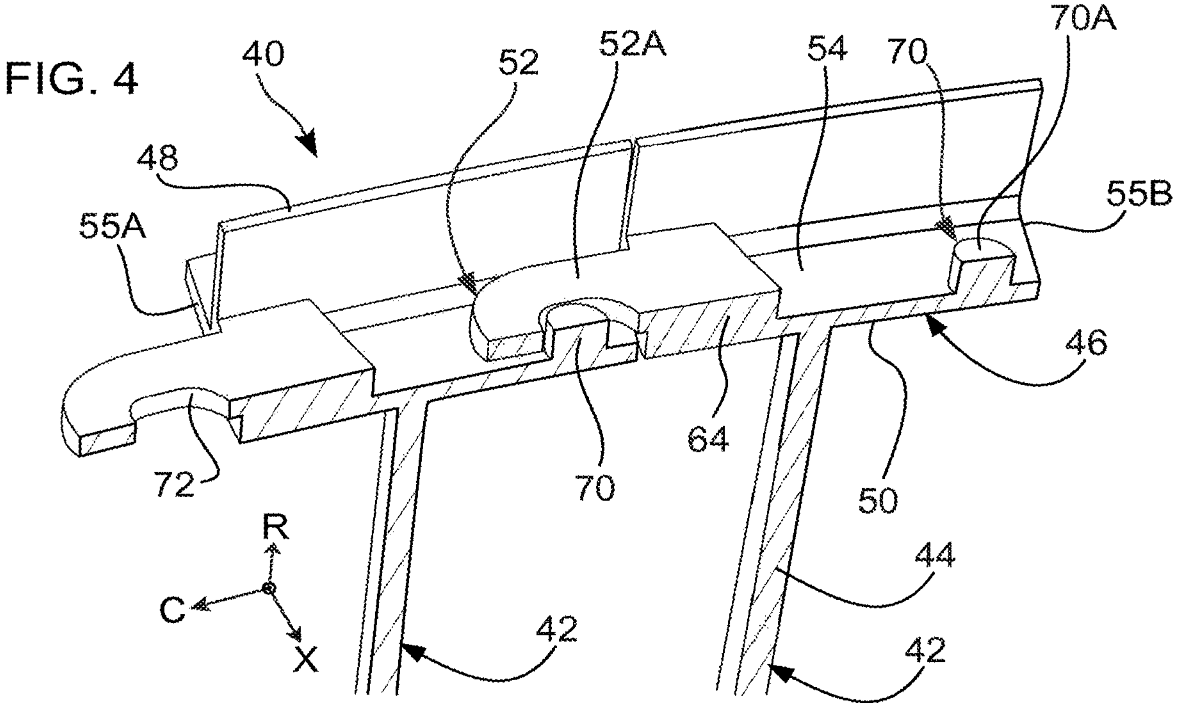
FIG. 4 is a schematic partial perspective and cross-sectional view of the bladed assembly of FIG. 2, showing two circumferentially adjacent blades of this bladed assembly.

FIGS. 2-4 illustrate a bladed assembly 40 for a turbomachine rotor, for example intended to be used within the low-pressure turbine 22 of the turbomachine 10 of FIG. 1 or of another turbomachine component.

Such a bladed assembly includes an annular row of blades 42 distributed about an axis of the bladed assembly that merges with the axis 28 when the bladed assembly is mounted within a turbomachine, and for example mounted on a corresponding rotor disk.

Figure 5:
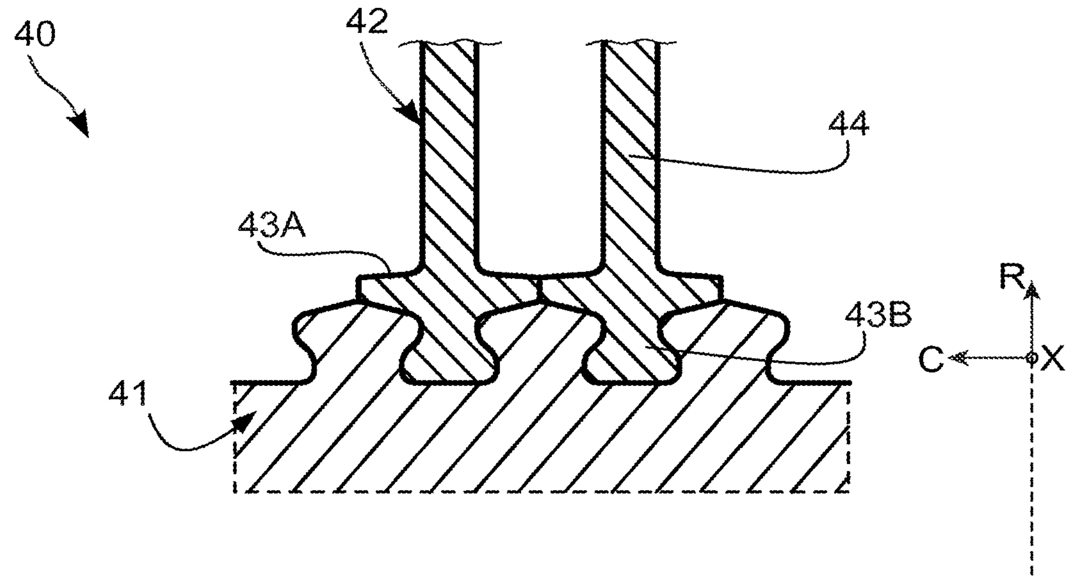
FIG. 5 is a schematic partial cross-sectional view of the bladed assembly of FIG. 2, showing the joining region between two blades of a disk of said bladed assembly.

Each blade 42 in particular includes an airfoil 44 and a platform 46 formed at the outer radial end of the airfoil 44. With reference to FIG. 5, such a blade 42 also typically includes a platform 43A arranged at the base of the airfoil 44 and a foot 43B arranged under the platform 43A to make it possible to mount the blade in a disk 41 of the bladed assembly 40.

The airfoils 44 of the blades have an aerodynamic profile that makes it possible for them to interact with the gases circulating in the primary duct PV.

The main function of the platforms 46 is to externally delimit the primary duct PV by means of respective inner surfaces 50 of the platforms, and to limit as best as possible the gas leaks around the bladed assembly 40 in order to maximise the interaction between the gas and the airfoils 44. To this end, the platforms 46 typically include ribs 48, commonly known as knife edges, formed radially outwardly protruding from the respective outer surfaces 54 of the platforms, and of which the ends are intended to hollow out corresponding grooves within a ring made of abradable material arranged about the bladed assembly 40 within a turbomachine.

Like known bladed assembly platforms, each of the platforms 46 have two circumferential ends 55A, 55B respectively facing corresponding circumferential ends of two platforms that are circumferentially adjacent thereto.

The bladed assembly 40 has the specific feature of offering a new mode of limiting the amplitude of the vibrations of the blades 42, the implementation of which is based on the fact that the platform 46 of each blade 42 includes a friction member 70 engaged through an opening 72 formed in the platform of a circumferentially adjacent blade and having an oblong closed section in the circumferential direction C so that the friction member 70 can move in the circumferential direction C within the opening 72 according to vibrations of the platforms. Therefore, it should be understood that the platform 46 of each blade includes both a friction member 70, which is engaged in the opening 72 of a subsequent blade, and an opening 72, wherein the friction member 70 of a preceding blade is engaged, the notions of subsequent blade and of preceding blade being considered with reference to an arbitrary direction of rotation about the axis 28. Moreover, according to the general definition of the invention, the opening therefore has a first dimension in the circumferential direction C, hereinafter known as "large dimension LD", a second dimension, smaller than the first dimension and hereinafter known as "small dimension SD", in a first direction orthogonal to the circumferential direction C, and the opening 72 is open according to a second direction orthogonal to the circumferential direction C and to the first direction. The friction member 70 can move at least in the circumferential direction C and can in the preferential example illustrated also move to a certain degree in the first direction. In other words, the friction member 70 is engaged in the opening 72 with clearance in the circumferential direction C and in the first direction.

The oblong closed section of the opening 72 is defined in a plane P (FIG. 3B) forming with the radial direction R an angle between 45 degrees and 90 degrees, and equal to 90 degrees in the preferential example illustrated. Thus, in this example, the first direction, that is to say the direction of the small dimension SD of the opening, is the axial direction X, whereas the opening is open in the radial direction R.

In addition, the friction member 70 has a geometry of revolution about an axis 73 that, at least in one nominal orientation of the friction member, extends in the radial direction R.

In the example illustrated, the friction member 70 is thus a pin of generally cylindrical shape having for axis the aforementioned axis 73.

In addition, the friction member 70 protrudes radially outwardly from the outer surface 54 of the platform 46 (FIG. 3B), and the platform 46 of each blade 42 comprises an engagement part 52 circumferentially extending protruding from one of the circumferential ends 55A of the platform, and through which the opening 72 is formed (FIG. 3A). The engagement part 52 is therefore circumferentially offset with respect to the outer surface 54.

The engagement part 52 is further radially outwardly offset with respect to the outer surface 54.

To this end, the platform 46 of each blade comprises for example, at the circumferential end 55A, a rim 64 extending radially protruding outwardly with respect to the outer surface 54 and from which the engagement part 52, in the form of a lug or a blade, projects circumferentially beyond the circumferential end 55A. Therefore, it must be understood that the engagement part 52 of a blade is radially disposed facing the outer surface 54 of the platform 46 of a circumferentially adjacent blade. The engagement part 52 is thus located outside of the primary duct PV, which is preferable to avoid disturbing the gas flow within the duct.

In the example illustrated, the friction member 70 is integrally formed with the platform 46. In addition, the friction member 70 has a radially outer end surface 70A that is level with a radially outer surface 52A of the engagement part 52 (FIG. 4).

Generally, mutual separation of the platforms 46 in the circumferential direction during operation due to vibrations of the blades causes the friction member 70 to move along an edge of the opening 72. This generates friction of the nature to dissipate the energy and therefore limit the amplitude of the vibrations, which makes it possible to limit the stresses in the blades.

Moreover, the cooperation between the friction member 70 and the opening 72 makes it possible to limit the clearance amplitude of the platforms 46 with respect to one another in the circumferential direction and in the first aforementioned direction. Indeed, due to the clearance provided between the edge of the opening 72 and the friction member 70 in the first aforementioned direction, that is to say the direction of the small dimension SD of the opening 72, when the friction member 70 is at a circumferential end of the opening 72, friction between the latter and the edge of the opening 72 occurs at said end according to vibrations of the platforms 46 in the first direction.

However, it should be noted that the opening 72 preferably has a circumferential extension that is sufficient so that during normal operation, the friction member 70, although likely to move closer to the circumferential ends of the opening 72, or even come into contact with the edge of the opening at these ends, does not transmit significant forces in the circumferential direction of the adjacent circumferential platform wherein the considered opening 72 is formed.

It should be noted that the invention of course also applies to bladed assemblies wherein the free ends of the blades are the radially inner ends of the latter, for example for contrarotary turbines. In this case, the configuration of the platforms is preferentially reversed in relation to the radial direction. Thus, the friction member extends in this case preferentially protruding radially inwardly from an inner surface of each platform, and the engagement part of each platform is preferably offset radially inwardly with respect to said inner surface of the platform.

The invention may further be applied to static bladed assemblies.

The invention claimed is:

1. A bladed assembly for a turbomachine, comprising:
a plurality of blades distributed about an axis and each comprising an airfoil, and a platform formed at a free end of the blade, and wherein the platform of each blade includes a friction member and an opening that is oblong in a circumferential direction with respect to the axis, the friction member being engaged through the opening formed in the platform of a circumferentially adjacent blade within the bladed assembly with a clearance allowing the friction member to move at least in the circumferential direction within the opening.

2. The bladed assembly according to claim 1, wherein an angle between a plane of an oblong closed section of the opening and a radial direction with respect to the axis, at said opening, is between 45 degrees and 90 degrees.

3. The bladed assembly according to claim 2, wherein the plane of said oblong closed section is orthogonal to the radial direction.

4. The bladed assembly according to claim 2, wherein said friction member has a geometry of revolution about an axis that extends in said radial direction.

5. The bladed assembly according to claim 2, wherein the platform of each blade has a surface from which said friction member protrudes radially, and an engagement part that extends circumferentially protruding from a circumferential end of the platform, which is radially offset with respect to the surface, and through which said opening is formed.

6. The bladed assembly according to claim 5, wherein said friction member is integrally formed with said platform.

7. The bladed assembly according to claim 5, wherein the friction member has an end surface level with a surface of the engagement part.

8. A turbine for a turbomachine, comprising at least one bladed assembly according to claim 1.

9. A turbomachine comprising at least one turbine according to claim 8.

* * * * *